United States Patent [19]
Barriac

[11] Patent Number: 4,530,164
[45] Date of Patent: Jul. 23, 1985

[54] GYROCOMPASS FOR SEA VEHICLES

[75] Inventor: Jacques Barriac, Plaisir, France

[73] Assignee: Societe d'Applications Generales d'Electricite et de Mecanique Sagem, Paris, France

[21] Appl. No.: 459,531

[22] PCT Filed: Jun. 3, 1982

[86] PCT No.: PCT/FR82/00093
§ 371 Date: Jan. 12, 1983
§ 102(e) Date: Jan. 12, 1983

[87] PCT Pub. No.: WO82/04313
PCT Pub. Date: Dec. 9, 1982

[30] Foreign Application Priority Data

Jun. 4, 1981 [FR] France ................... 81 11100

[51] Int. Cl.³ .......................................... G01K 17/384
[52] U.S. Cl. .................................................... 33/324
[58] Field of Search ................... 33/324, 301, 318, 322

[56] References Cited
U.S. PATENT DOCUMENTS

| | | | |
|---|---|---|---|
| 1,925,138 | 9/1933 | Dillman | 33/324 X |
| 3,229,376 | 1/1966 | Wilcox | 33/324 |
| 3,292,269 | 12/1966 | Brugger | 33/324 |
| 4,443,952 | 4/1984 | Schulien | 33/324 |

FOREIGN PATENT DOCUMENTS 1448527 3/1969 Fed. Rep. of Germany ........ 33/324

Primary Examiner—Harry N. Haroian
Attorney, Agent, or Firm—Larson and Taylor

[57] ABSTRACT

Gyrocompass for sea vehicle comprising a pendular mechanism (2) with two cardans, namely a rolling cardan (4) and a pitching cardan (5), a vertical fork (7) free to cooperate with said pendular mechanism (2), a site cardan (9) carried by said fork (7), a gyroscope with two degrees of freedom (11) carried by said site cardan (9), so that one of the two sensitivity axes ($G_z$) is vertical, the other sensitivity axis ($G_y$) being parallel to the axis of the site cardan (9), and its rotation axis (S) is horizontal, a horizontality sensor (12) carried by said site cardan, so that its sensitivity axis (P) is parallel to the rotation axis (S) of the gyroscope (11).

8 Claims, 9 Drawing Figures

GYROCOMPASS FOR SEA VEHICLES

The invention relates to gyrocompasses for sea-going vehicles, more especially for merchant ships, i.e. for civil applications in which questions of price assume a certain importance (in opposition to military applications).

Gyrocompasses are known comprising a two gimbal pendular mechanism, namely a roll gimbal and a pitch gimbal, this pendular mechanism supporting a suspended lower gimbal.

This suspended lower gimbal carries a free gyroscope housed in a sealed enclosure disposed inside an external enclosure filled with a floatation liquid and integral with the suspended lower gimbal.

Centering of the sealed enclosure inside the outer enclosure may be obtained by electric means (repulsion coil devices), by hydrostatic means (floatation liquids of different density) or by mechanical means (torsion bars).

In all cases, the outer enclosure has a vertical axis of rotation because it is suspended, through the lower gimbal, from the pendular mechanism; this outer enclosure is controlled to follow in azimuth the direction of the axis of rotation of the gyroscope.

The free gyroscopes used are gyroscopes with two degrees of freedom, which have both a possibility of free rotation in azimuth between the gyroscope and the outer enclosure containing the liquid (possibility of rotation sometimes limited to a few degrees), and a possibility of rotation in elevation (possibility of rotation generally less than or equal to 20°); however, only angular azimuth detection exists between the two, which allows control of the enclosure in azimuth. The gyroscope behaves then finally, for a half, like a free gyroscope and, in particular, it is then subjected to all the horizontal disturbing torques because of the friction and of the elevational movements of the outer enclosure which is pendular during rolling and pitching.

So, such a gyroscope must then be given a very high kinetic moment (of the order of $10^6$ c.g.s.) so that it may resist these horizontal disturbing torques; this leads to gyroscopes whose rotors have high masses (at least 500 g).

Moreover, the axis of rotation of the gyroscope remains horizontal and constantly oriented in a North-South direction, which makes the gyrocompass sensitive to a fixed drift of the gyroscope which creates a permanent unknown heading error.

The aim of the present invention is to provide a gyrocompass whose gyroscope has a much lower kinetic moment (of the order of $10^4$ c.g.s.) which may be 100 times smaller than the kinetic moment of the gyroscopes used in gyrocompasses known at present.

A further aim of the invention is to provide a gyrocompass alllowing Azimuth and elevation control and not only azimuth control as in the gyrocompasses known at present.

A further aim of the invention is to provide a gyrocompass in which the axis of rotation of the gyroscope is no longer constantly orientated in a North-South direction but on the contrary driven with a uniform angular speed while remaining in the horizontal plane.

Yet another aim of the invention is to provide a gyrocompass whose gyroscope may have very low drift stability performances, so be a low-priced gyroscope, with a long useful life (because of the low load on the bearings) and having excellent resistance to shocks and vibrations.

According to the invention, the gyrocompass comprises:

a two gimbal pendular mechanism, namely a roll gimbal and a pitch gimbal, a vertical fork cooperating freely with said pendular mechanism, an elevation gimbal carried by said fork, a gyroscope having two degrees of freedom carried by this elevation gimbal, so that one of its two axes of sensitivity is vertical, the other axis of sensitivity is parallel to the axis of the elevation gimbal and its axis of rotation is horizontal, a detector of horizontality carried by this elevation gimbal, so that its axis of sensitivity is parallel to the axis of rotation of the gyroscope, the vertical fork being azimuth controlled by the position detectors of the vertical axis of sensitivity of the gyro, the elevation gimbal being controlled in elevation by the position detectors of the other axis of sensitivity of the gyro, the detector of horizontally controlling solely the vertical precession torquer motor of the gyroscope (for the horizontal levelling of the axis of rotation of the gyroscope);

the horizontal precession torquer motor of the gyroscope being controlled so that the axis of rotation of the gyroscope moves in the horizontal plane with an angular speed (which may be one revolution per hour) which is uniform with respect to a fixed member such for example as the meridian.

With this arrangement, it is possible, by appropriately processing the slow sinusoidal signal (for example one cycle per hour) coming from the vertical precession torquer motor, which torquer compensates for the horizontal component of the Earth's rotational vector (which is orthogonal to the axis of rotation of the gyroscope) so as to maintain the axis of rotation of the gyroscope in a horizontal plane, to determine when this axis of rotation passes to North and to South and so to derive permanently therefrom the heading of the sea vehicle.

For each revolution of the axis of rotation of the gyroscope in the horizontal plane, two North search results are obtained, for example by synchronous demodulation of the slow sinusoidal signal from the vertical precession torquer motor of the gyroscope over a half cycle. This synchronous demodulation is effected from a demodulation reference which may be formed by a binary counter fed with a fixed frequency $f_0$, representing an angle whose successive decreasing values are $\pi$, $\pi/2$, $\pi/4$, ... $\pi/2^n$ and progress at the same frequency as that of the angular speed of the axis of rotation of the gyroscope in the horizontal plane.

Between the two times when the axis of rotation of the gyro passes to North and to South, the heading is known because of the known uniform angular speed of the axis of rotation of the gyro and because of the angular position detector of the azimuth gimbal.

The advantage of such a gyrocompass, with respect to known gyrocompasses, resides in the fact that North searching is independent of any fixed drift of the gyro.

Thus, the gyro used may have very low drift stability performances, so be a low-priced gyroscope with a long useful life (light spinner).

The invention consists, apart from the arrangement which has just been described, of other arrangements which are used preferably at the same time and which will be more explicitly discussed hereafter.

The invention will, in any case, be well understood from the complement of description which follows and the accompanying drawings, which complement and drawings are relative to a preferred embodiment of the invention and comprise, of course, no limiting character.

FIG. 1 of these drawings is a schematical perspective view of a gyrocompass constructed in accordance with the invention.

Figure 1:
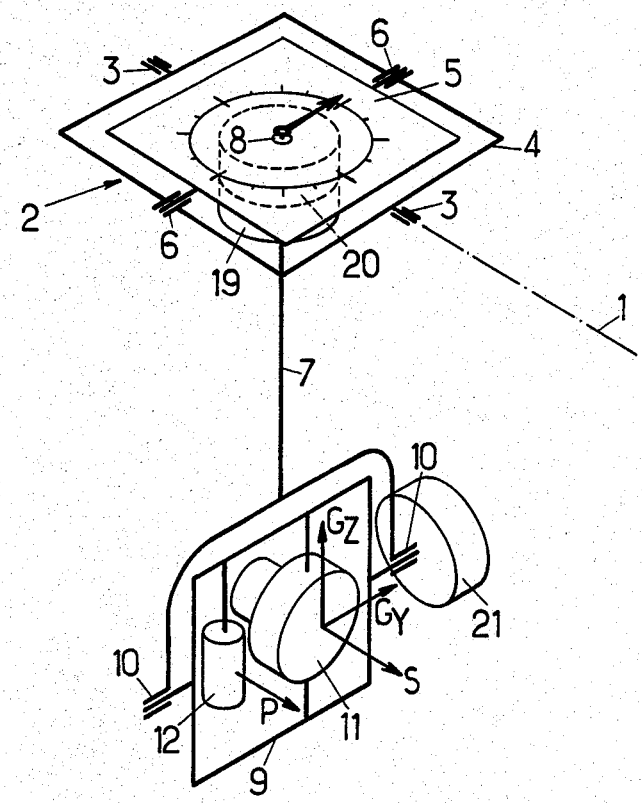

In the drawings 1 to 9, the sea vehicle is shown schematically by its longitudinal axis 1.

A pendular mechanism 2 is carried, through two fixed bearings 3, by a structure integral with the sea vehicle (not shown).

This pendular mechanism 2 comprises a balanced roll gimbal 4, mounted in the two fixed bearings 3 and a balanced pitch gimbal 5, mounted in two bearings 6 provided on the roll gimbal 4.

The pitch gimbal 5 cooperates with a vertical fork 7.

This vertical fork 7 may be suspended from this pitch gimbal 5 and rotate freely in a bearing 8 provided on the pitch gimbal 5 (FIG. 1).

Figure 9:
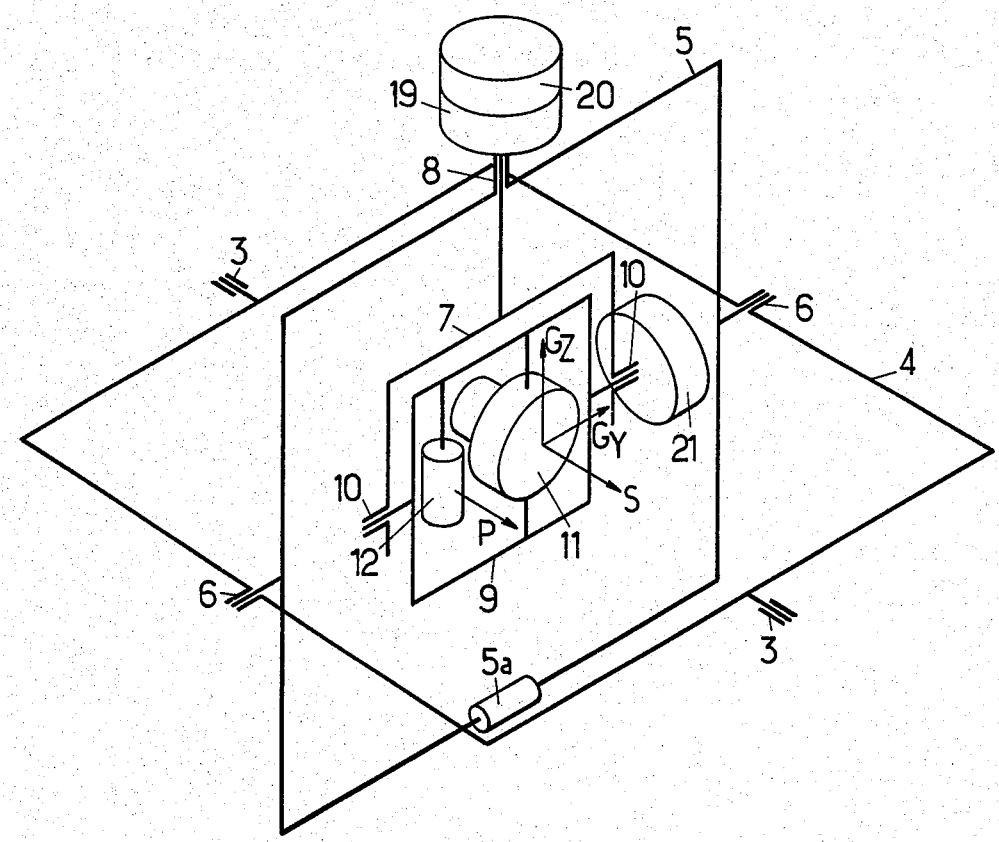
FIG. 9 is a view in schematical perspective of a gyroscope constructed in accordance with a variation of the invention.

In a variation of the invention, this vertical fork 7 may be internal to the pitch gimbal 5 and rotate freely in a bearing 8 provided on the pitch gimbal 5 which then comprises a considerable unbalance 5a (FIG. 9).

At the lower end of this fork 7, there is provided an elevation gimbal 9 mounted in two bearings 10 provided on said lower end.

A gyro 11, with two degrees of freedom, is mounted on the elevation gimbal 9, so that one of its two axes of sensitivity, axis $G_z$, is vertical, the other axis of sensitivity, axis $G_y$, is parallel to the elevation gimbal 9, which axis is defined by the two bearings 10, and its axis of rotation S is horizontal.

A detector of horizontality 12 is also mounted on the elevation gimbal 9, so that its axis of sensitivity P is parallel to the axis of rotation S of the gyro 11.

Figure 2:
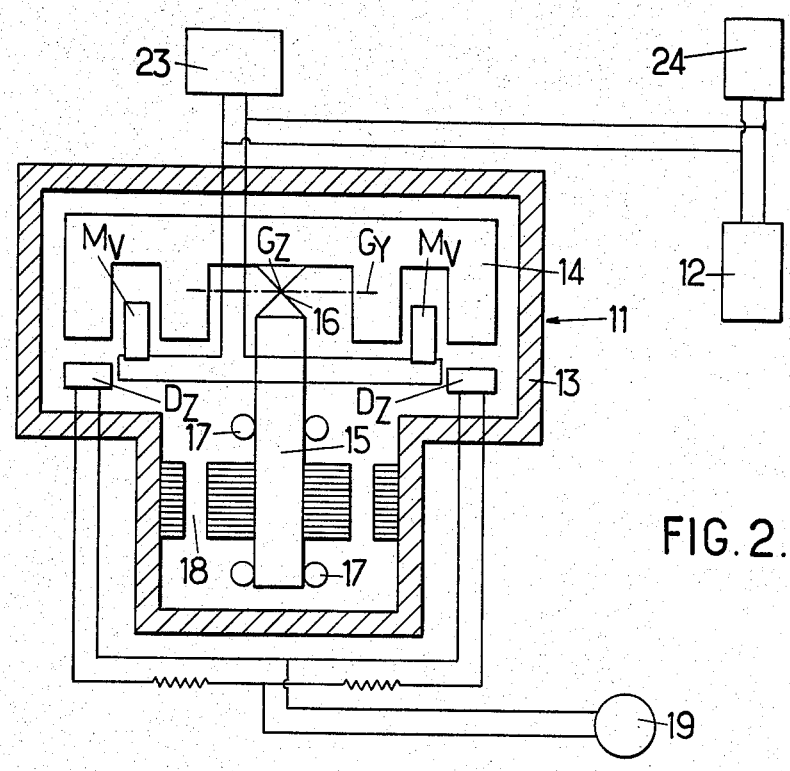
FIGS. 2 and 3 are sectional views, respectively in two perpendicular planes, of the gyroscope of the gyrocompass of FIG. 1.
Figure 3:
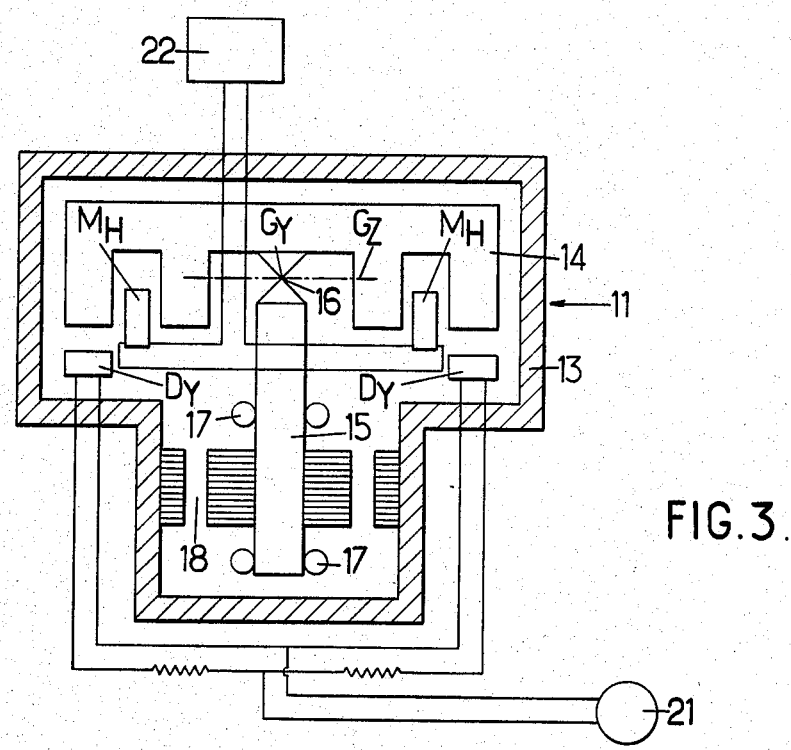

Gyro 11 comprises, as shown in FIGS. 2 and 3,
a frame 13,
a rotor 14 supported by a shaft 15 with interpositioning of a HOOCKE seal 16, this shaft 15 being held in bearings 17,
and an electric motor 18 driving the assembly formed by shaft 15 and rotor 14.

Two position detectors $D_z$ are provided for cooperation with rotor 14 and measuring its movements with respect to the vertical axis of sensitivity $G_z$ of gyro 11 (FIG. 2).

Two further position detectors $D_y$ are provided for cooperation with rotor 14 and measuring its movements with respect to the axis of sensitivity $G_y$ of gyro 11 (FIG. 3).

A vertical precession torquer motor $M_V$ is provided for cooperation with rotor 14 and causing a vertical precession of gyro 11 (FIG. 2).

A further horizontal precession torquer motor $M_H$ is provided for cooperation with rotor 14 and causing a horizontal precession of the gyro 11 (FIG. 3).

The vertical fork 7 comprises a stabilization control motor 19 and an angular position detector 20.

The elevation gimbal 9 comprises a stabilization control motor 21.

Such being the case, the following controls are provided:

the control motor 19 for the vertical fork 7 is controlled in azimuth by the detectors $D_z$ of the position of the vertical axis of sensitivity $G_z$ of gyro 11, the control motor 21 for the elevation gimbal 9 is controlled in elevation by the detectors $D_y$ of the position of the axis of sensitivity $G_y$ of gyro 11.

The horizontal precession torquer motor $M_H$ of gyro 11 is controlled, by appropriate control means 22 so that the axis of rotation S of gyro 11 moves in the horizontal plane at a uniform angular speed.

The vertical precession torquer motor $M_V$ of the gyro 11 receives, from an appropriate compensation device 23 having as input an electric signal representing the pendular inclination and forming (by an appropriate computing function) a signal serving for compensation of the Earth's rotation, a control signal for maintaining the axis of rotation of gyro 11 in a horizontal plane.

Figure 4:
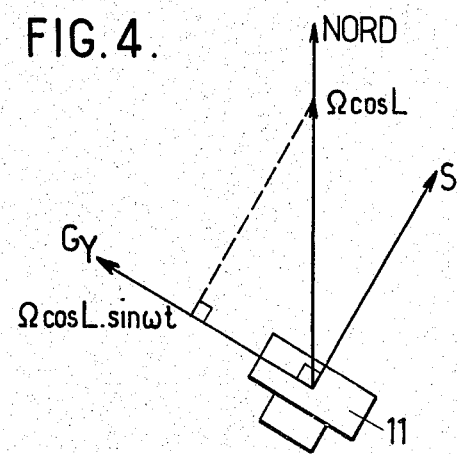
FIG. 4 is a vectorial diagram explaining the invention.

In FIG. 4 there is shown the axis of rotation S of gyro 11, the axis of sensitivity $G_y$ of gyro 11 and the direction of North N (North horizontal).

The vector $\Omega \cos L$ is projected on the direction of the North ($\Omega$ designating the Earth's rotation and L the latitude). The angle formed by the direction of North and the axis of rotation S of the gyro is equal to $\omega_c \cdot t$ ($\omega_c$ designating the angular speed of the axis of rotation S in the horizontal plane and t the time).

The vertical precession torquer motor $M_V$ of gyro 11 delivers a signal $\Omega \cos L \sin \omega t$ which is the projection of the vector $\Omega \cos L$ on the axis of sensitivity $G_y$ of gyro 11.

Figure 5:
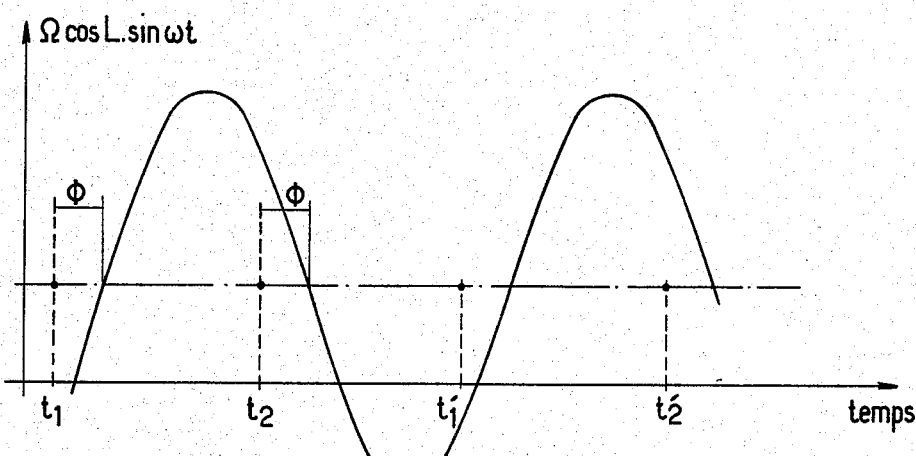
FIG. 5 is a sinusoidal curve showing the evolution of a signal formed by the gyrocompass in accordance with the invention.

In FIG. 5 there has been shown this sinusoidal signal $\Omega \cos L \sin \omega t$, the abscissa being the time and the ordinates the current of the vertical precession torquer motor $M_V$ of gyro 11.

On this signal is superimposed an unknown constant which represents the drift of the gyro.

Times $t_1$ and $t_2$ correspond to the times when the axis of rotation S of gyro 11 passes to North and South.

Figure 6:
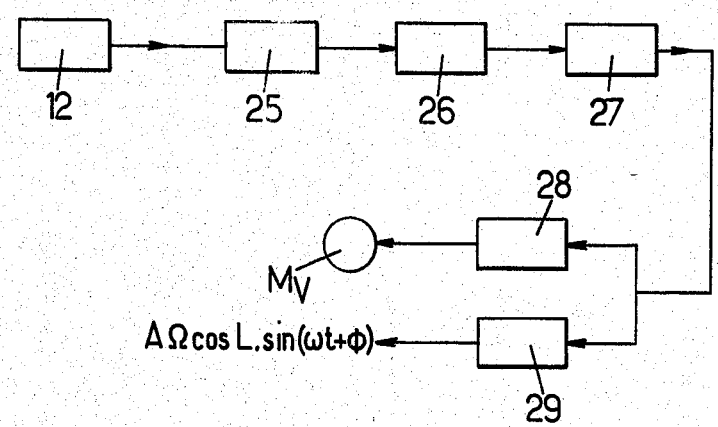
FIGS. 6, 7 and 8 are block diagrams showing one particular embodiment of the invention.

The detector of horizontality 12 outputs a signal which, as shown in FIG. 6, is amplified in an amplifying cell 25 then demodulated in a demodulating cell 26. The demodulated signal is filtered in a filtering cell 27 whose output signal is fed in parallel to two operational amplifiers 28 and 29.

Operational amplifier 28 delivers a continuous precession signal which is used in the vertical precession torquer motor $M_V$ of gyro 11. Operational amplifier 29 delivers a continuous signal which is in the form A $\Omega \cos L \cdot \sin(\omega t + \phi)$, A designating a coefficient of amplification and $\phi$ the phase shift due to filtering (FIG. 5).

It is thus possible, by appropriate processing in a handling device 24 of the signal from the vertical precession torquer motor $M_V$ of gyro 11, to determine when the axis of rotation of gyro 11 passes to North and to South and so to permanently drive therefrom the heading of the vehicle.

Figure 7:
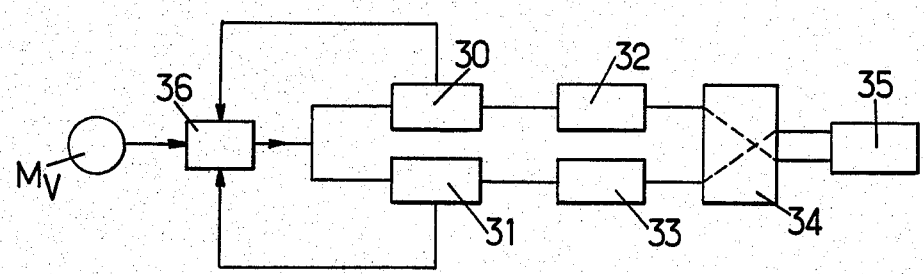

As shown in FIG. 7, this signal from the vertical precession torquer motor $M_V$ of gyro 11 is combined in a three input integrator 36 which reverse calibrated pulses fromed in threshold detectors, a positive threshold detector 30 and a negative threshold detector 31.

Two incrementation cells 32 and 33 complete the processing of the signal which is then fed, through a switch device 34 into an up-down counter 35. This switch device 34 is triggered when the axis of rotation S of gyro 11 passes to $\pi/2$ and to $(3\pi/2)$, such as derived from the contents of the counter (FIG. 8) incremented at a fixed frequency, and which is an estimate of the shift of the axis of rotation of gyro 11 with respect to North.

Figure 8:
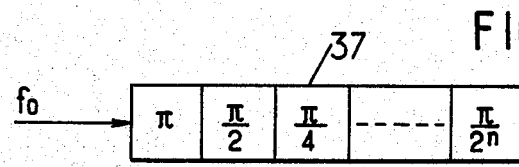

In FIG. 8, there is shown the counter 36 receiving the fixed frequency $f_o$ whose decreasing values are $\pi$, $\pi/2$, $\pi/4 \ldots \pi/2^n$ and evolve in accordance with a modulus of $2\pi$ at the same frequency as that of the angular rate of the axis of rotation of gyro 11 in the horizontal plane.

With this up-down counter 37 (synchronous demodulation reference) the value $\omega t + \Delta K$ can be identified in which $\Delta K$ represents the heading error, a result obtained after a half count cycle of the up-down counter 35.

From the constructional point of view, it should be noted that the gyro 11 with two degrees of freedom may be formed:
either by a "dry" gyro with two controlled axes,
or by a "floating" gyro having two degrees of freedom and two controlled axes.

In so far as the detector of horizontality 12 is concerned, it may be formed:
either by a damped pendulum
or by bubble levels
or by an accelerometer with controlled mass.

As is evident and as it follows moreover already from what has gone before, the invention is in no wise limited to those of its modes of application and embodiments which have been more especially considered; it embraces, on the contrary, all variations thereof.

I claim:
1. Gyrocompass for a sea vehicle, comprising:
    a pendular mechanism having a roll gimbal and a pitch gimbal;
    a vertical fork suspended from said pendular mechanism;
    an elevation gimbal carried by said fork having a horizontal axis of movement;
    a gyroscope having two degrees of freedom which is carried by said elevation gimbal, said gyroscope also having a vertical axis of sensitivity, a vertical precession torquer motor for causing a vertical precession of said gyro about said vertical axis, a horizontal axis of sensitivity parallel to the axis of said elevation gimbal, a horizontal precession torquer motor for causing a horizontal precessing of said gyro about said horizontal axis, and a horizontal rotation axis; and
    a detector of horizontality having an axis of sensitivity which is carried by said elevation gimbal such that the axis of sensitivity is parallel to the rotation axis of said gyroscope, said detector further including
    (a) a position detector means of the vertical sensitivity axis of said gyroscope for controlling said vertical fork in azimuth,
    (b) a position detector of the horizontal sensitivity axis of said gyroscope for controlling said elevation gimbal in elevation,
    (c) a means for controlling said vertical precession torquer motor of said gyroscope such that the rotation axis of said gyroscope is horizontally leveled, said means causing said vertical precession torquer motor to produce a sinusoidal signal which is a function of the operation of said vertical precession torquer motor compensating for the rotation the Earth,
    (d) a means for controlling said horizontal precession torquer motor of said gyroscope such that the rotation axis of said gyroscope moves in a horizontal plane at a uniform angular speed with respect to a fixed origin, and
    (e) a computer means which receives the sinusoidal signal from said vertical precession torquer motor for determining when the rotation axis passes North to South and for permanently calculating the heading of the sea vehicle.

2. Gyrocompass according to claim 1, characterized by the fact that the gyroscope is a dry gyroscope with two controlled axes.

3. Gyrocompass according to claim 1, characterized by the fact that the gyroscope is a floating gyroscope with two axes of freedom and two controlled axes.

4. Gyrocompass according to claim 1, characterized by the fact that the detector of horizontality is formed by a damped pendulum.

5. Gyrocompass according to claim 1, characterized by the fact that the detector of horizontality is formed by bubble levels.

6. Gyrocompass according to claim 1, characterized by the fact that the detector of horizontality is formed by an accelerometer with controlled mass.

7. Gyrocompass according to claim 1, characterized by the fact that the fork is freely suspended from the pitch gimbal.

8. Gyrocompass according to claim 1, characterized by the fact that the fork is internal to the pitch gimbal which then comprises a vertical frame and a weight at the lowermost part of said frame.

* * * * *